United States Patent [19]

Muraski

[11] Patent Number: 5,664,848
[45] Date of Patent: Sep. 9, 1997

[54] APPARATUS FOR ABSORBING SHOCKS IN A VEHICLE BRAKING SYSTEM

[76] Inventor: Richard E. Muraski, 2710 Gateway Oaks Dr., Suite 225 South, Sacramento, Calif. 95833

[21] Appl. No.: 651,898

[22] Filed: May 21, 1996

[51] Int. Cl.$^6$ .................................................. B60T 17/04
[52] U.S. Cl. .................................................. 303/87; 138/31
[58] Field of Search .................................. 303/87; 138/30, 138/31, 26, 37, 41

[56] References Cited

U.S. PATENT DOCUMENTS

| | | | |
|---|---|---|---|
| 3,677,334 | 7/1972 | Bathla et al. | 138/31 X |
| 3,757,523 | 9/1973 | Resuggan et al. | 138/31 X |
| 4,152,786 | 5/1979 | Clark et al. | 138/31 X |
| 4,166,655 | 9/1979 | Spero | 303/87 |
| 4,188,073 | 2/1980 | Ishikawa et al. | 303/87 |
| 5,078,455 | 1/1992 | Washington | 303/87 X |
| 5,460,438 | 10/1995 | Hellmann et al. | 303/87 X |

FOREIGN PATENT DOCUMENTS

| 5039022 | 2/1993 | Japan | 303/87 |
|---|---|---|---|

*Primary Examiner*—Peter M. Poon
*Attorney, Agent, or Firm*—George J. Netter

[57] ABSTRACT

Pneumatic medium in a vehicle brake system is applied against one side of a flexible membrane (48) folded about an end portion of a piston (40) resiliently positioned against a coil spring (36). Pressure peaks in the pneumatic medium are damped by the membrane motion against the spring-loaded piston (40) preventing so-called lockup.

9 Claims, 2 Drawing Sheets

APPARATUS FOR ABSORBING SHOCKS IN A VEHICLE BRAKING SYSTEM

BACKGROUND

1. Field of the Invention

The present invention relates generally to automotive vehicle braking systems, and, more particularly, to shock absorption apparatus for inclusion in such systems for absorbing shocks to prevent unequal brake application to the different vehicle wheels resulting from that source.

2. Description of Related Art

Pneumatic braking systems are conventionally utilized in automotive vehicles and especially in trucks, truck trailers and the like. There are many factors (e.g., road conditions) which can cause unequal or uneven application of the brakes producing undesirable results, such as so-called "lockup" which can produce accidents. Various apparatus/have been suggested in the past for eliminating, or at least alleviating, this condition such as, for example, APPARATUS FOR EQUALIZING PRESSURE AND ABSORBING SHOCK IN A PNEUMATIC BRAKING SYSTEM, U.S. Pat. No. 4,166,655. The system of this patent and of all other known systems, although alleviating the problem to a certain extent are subject to drawbacks, such as being relatively complicated and expensive to make and somewhat unsatisfactory because of poor reliability in operation.

SUMMARY OF THE DISCLOSURE

In accordance with the described invention there is provided an apparatus which is interconnected with the pneumatic lines of a pneumatic brake system for an automotive vehicle, truck trailer or the like. The described apparatus generally includes a substantially cylindrical housing having one end portion to which leads in the pneumatic system are mutually interjoined to permit passage of the pneumatic medium therethrough. The opposite end portion of the housing includes an upstanding coil spring having a first end received onto a generally disk-like seat and a second end received within a piston resiliently movable within the housing. The edge portions of a membrane are clampingly located between two housing body halves which are releasably enjoined together to form the unitary housing. The centralmost parts of the membrane are folded onto a piston outer face with further portions extending partway about the piston lateral sides.

During use, changes in pneumatic pressure exceeding a predetermined minimum will expand the membrane to drive it against the piston and underlying spring which serves to automatically reduce the pneumatic pressure in the housing and thus the pressure in the associated pneumatic lines as well as within the wheel brake chambers. As a result of this continuously operating pneumatic volume change responsive to increases in pneumatic medium pressure, pneumatic medium pressure swings are damped which prevents brake lockup and smooths brake operation generally. The folded relationship of the membrane about the piston enhances reliability of operation and extends useful life considerably.

DESCRIPTION OF A PREFERRED EMBODIMENT

It is well known that pneumatic braking systems for vehicles, especially domestic automotive vehicles, trucks and truck trailers, can, if permitted to be subjected to unrestrained or uncompensated shocks, produce malfunction or dangerous and damaging operational conditions, such as "lockup" where one or more wheels refuse to turn. It has been found that these undesirable results are produced by uneven force distribution of the pneumatic medium typically resulting from encounter with nonuniform road surface conditions or having unevenly worn tires, among other things. As will be more particularly described, the present invention eliminates these undesirable occurrences in pneumatic brake systems by smoothing out pressure shocks exhibited in the pneumatic medium of the braking system during system operation.

Figure 1:
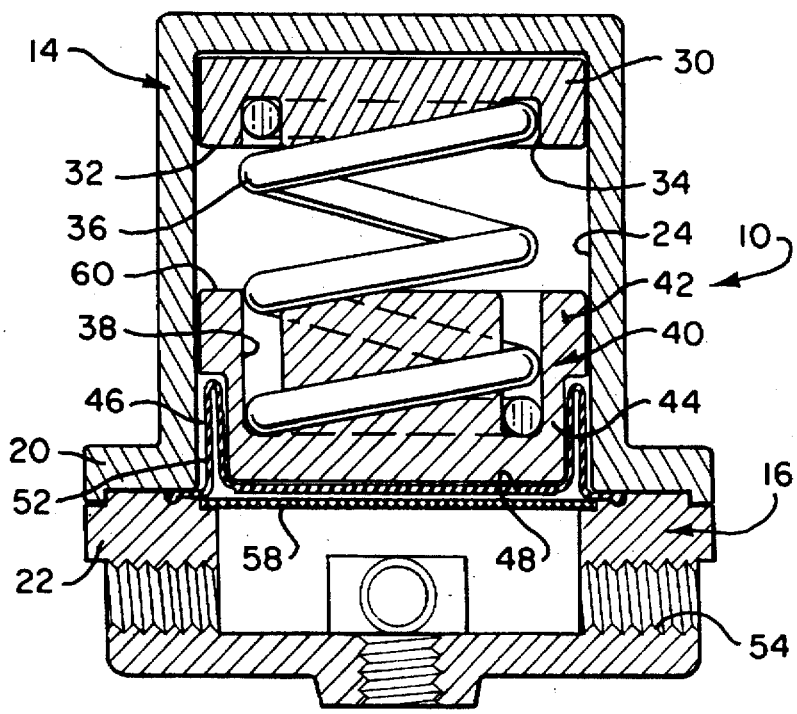
FIG. 1 is an exploded view showing the different parts of the apparatus of this invention.
Figure 2:
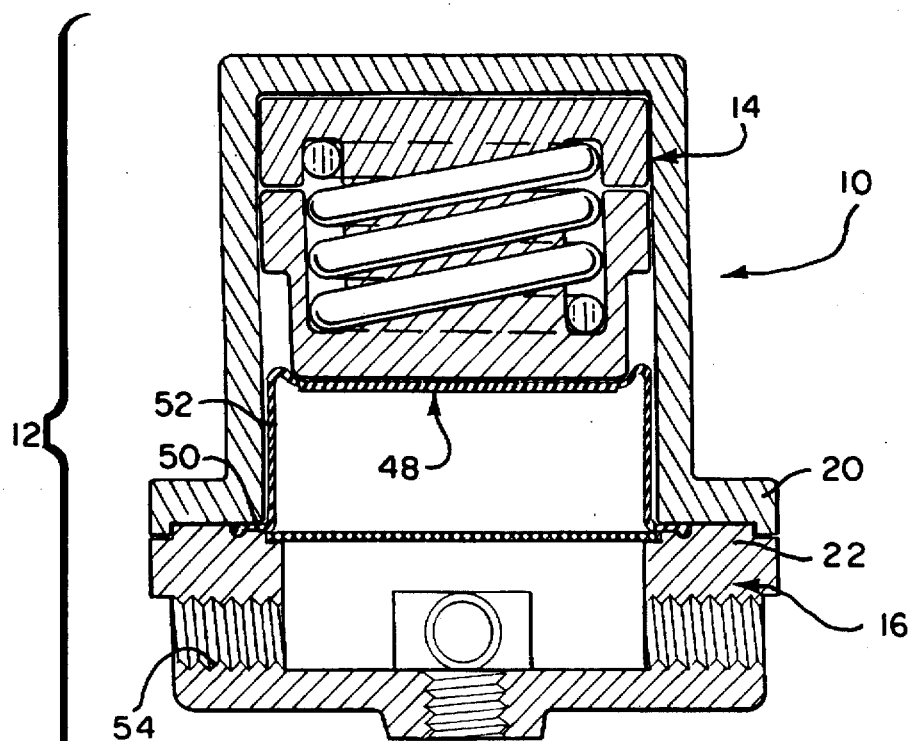
FIG. 2 is a side elevational, sectional view taken along the line 2—2 of FIG. 1 showing the apparatus reacting to a pressure peak.
Figure 3:
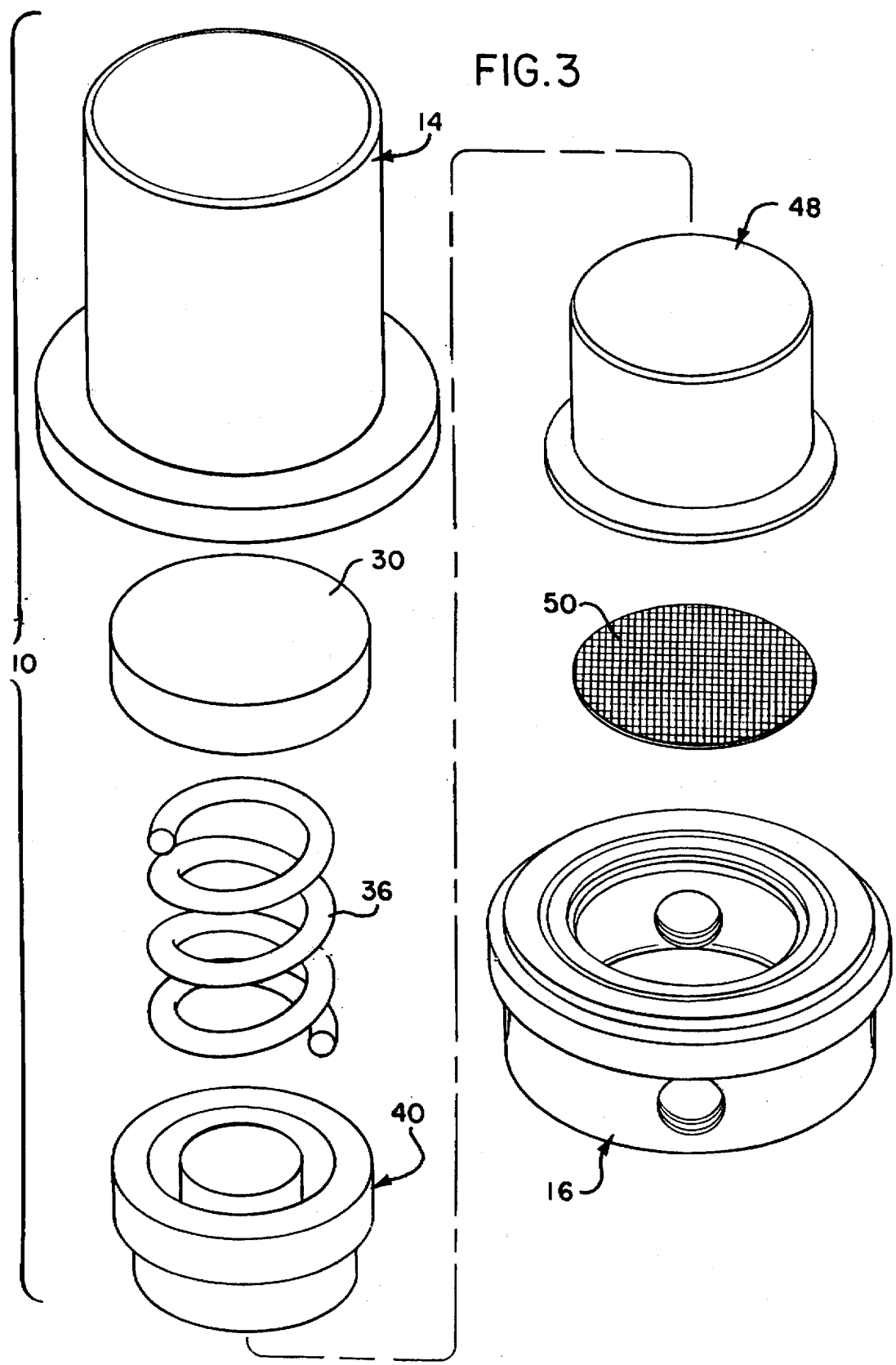
FIG. 3 is a side elevational, partially fragmentary view of the shock absorbing apparatus of the present invention in an unstressed state.

The present invention as shown in FIGS. 1 and 2, and enumerated generally as 10, is seen to include a generally cylindrical housing 12 formed from first and second cylindrical parts 14 and 16 having open ends secured together by threaded means 18 extending through flanges 20 and 22, respectively, on the housing parts exterior. The internal cavity 24 of the first cylindrical part 14 is cylindrical with a uniform diameter.

A generally cylindrical positioning cap 30 has an outer diameter enabling sliding fitting relationship within the housing cylindrical part cavity 24.

The inwardly directed surface 32 of the cap 30 includes a shallow circular opening 34 facing into the open cavity 24. More particularly, the opening 34 is spaced inwardly from its peripheral circumferential surface at all points and is dimensioned to completely receive an end loop of a helical compression spring 36.

The other or second end of the coil spring 36 is received within a relatively deep cylindrical slot 38 formed in an end face of a piston 40 which is also slidingly received within the cavity 24. More particularly, the piston has a first relatively large diameter portion 42 which fits slidingly within the cavity 24 and a second smaller diameter portion 44 continuously held spaced at 46 from the inner wall of cavity 24. Also, several loops of spring 36 are securely positioned within slot 38.

A resilient flexible membrane 48 (e.g., butyl rubber) is generally circular in geometry with a continuous outer edge portion 50 that is clampingly secured between the facing edge surfaces of flanges 20 and 22 of the respective housing parts 14 and 16 on assembly. Just inwardly of the edge portion 50 a continuous fold 52 is formed in the membrane 48 in a circular path extending upwardly into the space 46. The fold has an inner diameter enabling sliding fit onto the reduced diametral portion 44 of the piston to contactingly extend across the outer end surface of piston.

The second housing part 16 has a plurality of threaded openings 54 in its side walls for accommodating pneumatic lines (not shown) threaded therewithin. The open mouth of part 16 is covered by a screen 58 having edge portions clamped between the housing flanges 20 and 22 on assembly of parts 14 and 16.

In use, pressurized pneumatic medium provided via pneumatic lines fills the second housing part 16 and contacts the lower part of the membrane as depicted in FIG. 1. When a relatively sharp variation in pneumatic medium pressure occurs this causes the central folded membrane portion to become distended driving against the piston 40 and compressing the coil spring 36 to the condition shown in FIG. 2. This action results in reduced pneumatic medium pressure change experienced at the various wheel brakes.

It is important to note that the amount of spring compression is limited by the facing edge surfaces 32 and 60 of parts 14 and 16 coming into contact with each other. Specifically, it enhances the spring life to maintain spring compression at all times substantially less than maximum. At no time in the described construction is the spring able to "bottom out".

In a practical construction of the invention, cylindrical parts 14 and 16 are contemplated as preferably constructed of cast aluminum. It is also contemplated that excellent results can be obtained by constructing these same parts of a synthetic plastic materials, such as a Ryton PPS Compound, which is a trade designation of the Phillips Petroleum Company, Bartlesville, Okla.

Although the present invention is described in connection with a preferred embodiment, it is to be understood that those skilled in the appertaining arts may effect changes that are within the spirit of the invention described and within the ambit of the appended claims.

What is claimed is:

1. Apparatus for reducing pressure peaks of a pneumatic medium within a vehicle braking system below a predetermined maximum, comprising:

a housing wall means including first and second cylindrical parts each having an internal cavity and an open circular end, said open circular ends being fitted together such that the internal cavities together form a chamber having first and second end walls, said housing wall means including openings;

a cap located within the chamber adjacent the first end wall;

a coil spring within the chamber having one end abutting against the cap and extending away therefrom toward the second end wall of the chamber;

a piston received within the chamber and having a first end portion contacting the spring other end and a second end portion extending away from the spring toward the chamber second end wall;

membrane means having peripheral edge margins continuously sealingly affixed to the housing wall means and a central portion of said membrane means being folded about the piston other end portion; and a mesh plate having edge portions affixed to the housing means and including a central part located between the membrane means and that part of the chamber including the housing wall means openings, said membrane means peripheral edge margins and the mesh plate edge portions are clamped between the first and second cylindrical parts at the open circular ends.

2. Apparatus as in claim 1, in which medium increasing pressure peaks unfold the membrane means and drive the piston against the spring reducing medium peak pressure.

3. Apparatus as in claim 1, in which the membrane means is constructed of a butyl rubber.

4. Apparatus as in claim 1, in which the housing wall means first part cavity is cylindrical with a uniform diameter; said piston having a first relatively large diametral end portion contacting the coil spring and slidingly received within the first part cavity, and a second relatively smaller diametral end portion having peripheral wall portions spaced from cavity wall surfaces at all points; said membrane means having a central portion contacting the piston second end portion and folding into the space between the cavity wall surfaces and the piston peripheral wall portions.

5. Apparatus as in claim 1, in which the housing wall means are constructed of cast aluminum.

6. Apparatus as in claim 1, in which the housing wall means are constructed of molded synthetic plastic.

7. Apparatus for reducing pressure peaks of a pneumatic medium within a vehicle braking system below a predetermined maximum, comprising:

housing wall means enclosing a chamber having first and second end walls, said housing wall means including first and second cylindrical parts, each having an internal cavity and an open circular end, said open circular ends being fitted together such that the internal cavities together form said chamber;

a cap located within the chamber adjacent the first end wall;

a coil spring within the chamber having one end abutting against the cap and extending away therefrom toward the second end wall of the chamber;

a piston received within the chamber and having a first end portion contacting the spring other end and a second end portion extending away from the spring toward the chamber second end wall;

a butyl rubber membrane having peripheral edge margins continuously sealingly affixed to the housing wall means and a central portion of said membrane folded about the piston second end portion;

openings in the housing wall means through which pneumatic medium passes into the chamber and in pressurizing contact with the membrane tending to urge said membrane toward the piston;

a mesh plate having edge portions affixed to the housing wall means and includes a central part located between the membrane and that part of the chamber including the housing wall means openings, said membrane peripheral edge margins and the mesh plate edge portions are clamped between the first and second cylindrical parts at the open circular ends.

8. Apparatus as in claim 7, in which medium increasing pressure peaks unfold the membrane means and drive the piston against the spring reducing medium peak pressure.

9. Apparatus as in claim 7, in which the housing wall means first part cavity is cylindrical with a uniform diameter; said piston having a first relatively large diametral end portion contacting the coil spring and slidingly received within the first part cavity, and a second relatively smaller diametral end portion having peripheral wall portions spaced from cavity wall surfaces at all points; said membrane having the central portion contacting the piston second end portion and folding into the space between the cavity wall surfaces and the piston peripheral wall portions.

* * * * *